US012335699B2

(12) United States Patent
Ye et al.

(10) Patent No.: US 12,335,699 B2
(45) Date of Patent: Jun. 17, 2025

(54) SYSTEM FOR GENERATING A DRIVE SIGNAL AND METHOD FOR GENERATING A DRIVE SIGNAL

(71) Applicant: AAC Technologies (Nanjing) Co., Ltd., Nanjing (CN)

(72) Inventors: Lijian Ye, Nanjing (CN); Yuheng Jiang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 251 days.

(21) Appl. No.: 18/323,395

(22) Filed: May 24, 2023

(65) Prior Publication Data

US 2024/0334126 A1 Oct. 3, 2024

Related U.S. Application Data

(63) Continuation of application No. PCT/CN2023/089866, filed on Apr. 21, 2023.

(30) Foreign Application Priority Data

Mar. 31, 2023 (CN) ......................... 202310343205.9

(51) Int. Cl.
*H04R 3/04* (2006.01)
*G08B 6/00* (2006.01)

(52) U.S. Cl.
CPC ................. *H04R 3/04* (2013.01); *G08B 6/00* (2013.01); *H04R 2430/01* (2013.01)

(58) Field of Classification Search
CPC .. H04R 3/04; H04R 2430/01; H04R 2499/11; G08B 6/00; G08B 3/10
USPC ............... 381/162, 163, 164, 119, 94.1–94.9
See application file for complete search history.

(56) References Cited

U.S. PATENT DOCUMENTS

| | | | | |
|---|---|---|---|---|
| 10,972,826 | B1 * | 4/2021 | Tseng | H04R 1/1008 |
| 11,039,234 | B2 * | 6/2021 | Linjama | A63F 13/285 |
| 11,265,651 | B2 * | 3/2022 | Hashimoto | H04R 3/00 |
| 12,192,730 | B2 * | 1/2025 | Tang | H04R 1/02 |
| 2003/0122658 | A1 * | 7/2003 | Takahashi | G08B 6/00 340/407.1 |
| 2015/0010173 | A1 * | 1/2015 | Bernal Castillo | H04R 17/00 381/162 |

(Continued)

*Primary Examiner* — Xu Mei
(74) *Attorney, Agent, or Firm* — Wiersch Law Group

(57) ABSTRACT

This application provides a system for generating a drive signal and a method for generating a drive signal for driving a two-in-one device integrating a first component capable of generating sound and a second component capable of generating vibration. The system includes an audio signal pre-processing module, configured to perform low-frequency filtering and acoustic effect processing on an input signal according to a high-pass filtering parameter to obtain an audio signal; a vibration signal generation module, configured to generate a vibration signal based on an acoustic characteristic of the audio signal or a preset vibration library; a signal synthesis module, configured to superpose the audio signal with the vibration signal to output the drive signal; and an amplitude-limiting control module, configured to determine whether the audio signal and the vibration signal exceeds a maximum allowable range when superposed, and attenuate the audio signal and/or the vibration signal.

10 Claims, 4 Drawing Sheets

(56) References Cited

U.S. PATENT DOCUMENTS

| | | | | |
|---|---|---|---|---|
| 2015/0304745 | A1* | 10/2015 | Fromel | H04R 7/045 381/162 |
| 2015/0332659 | A1* | 11/2015 | Ebeling | G10H 1/00 84/645 |
| 2016/0012687 | A1* | 1/2016 | Obana | G08B 6/00 340/407.1 |
| 2024/0340587 | A1* | 10/2024 | Lan | H04R 3/04 |

* cited by examiner

SYSTEM FOR GENERATING A DRIVE SIGNAL AND METHOD FOR GENERATING A DRIVE SIGNAL

TECHNICAL FIELD

The present application relates to signal generation modules, and more particularly to a system for generating a drive signal and a method for generating a drive signal.

BACKGROUND

The existing mobile devices need to be multi-functional, and thus more or more components are integrated therein. In the case of the limited overall space, how to reduce the size of components and improve the space utilization has been a problem urgently to be solved for the manufacturers.

The prior art discloses a two-in-one device integrating a speaker and a motor, where the speaker and motor can be connected separately to the power amplifier in a conventional way. This two-in-one device is beneficial to the size reduction of the terminal equipment.

However, the components in the existing two-in-one devices are still driven separately by using an audio signal and a vibration signal, and thus the components are connected still through the existing double-ended connection, which is not conducive to the reduction of the space occupation of the terminal equipment.

Therefore, it is urgently needed to design and develop a novel signal generation module to solve the above problems.

SUMMARY

The technical problem to be solved by the present application is to provide a system for generating a drive signal and a method for generating a drive signal of a two-in-one device.

Technical solutions of this application will be specifically described below.

In a first aspect, this application provides a system for generating a drive signal, wherein the drive signal is configured to drive a two-in-one device integrating a first component capable of generating sound and a second component capable of generating vibration; and the system comprises:

an audio signal pre-processing module;

a vibration signal generation module;

a signal synthesis module; and an amplitude-limiting control module;

wherein the audio signal pre-processing module is configured to receive an input signal, and perform low-frequency filtering and acoustic effect processing on the input signal according to a high-pass filtering parameter to obtain an audio signal;

the vibration signal generation module is configured to generate a vibration signal based on an acoustic characteristic of the audio signal or a preset vibration library;

the signal synthesis module is configured to superpose the audio signal with the vibration signal to output the drive signal for driving the two-in-one device; and the amplitude-limiting control module is configured to determine whether the audio signal and the vibration signal exceed a maximum allowable range of the first component and the second component when the audio signal and the second signal are superposed, and attenuate the audio signal and/or the vibration signal.

In some embodiments, the audio signal pre-processing module comprises a high-pass filtering sub-module, a dynamic enhancement sub-module and a bass enhancement sub-module, wherein the high-pass filtering sub-module is configured to perform low-frequency filtering on the input signal according to the high-pass filtering parameter to obtain a high-frequency signal; the dynamic enhancement sub-module is configured to dynamically adjust the high-frequency signal to improve audio loudness; and the bass enhancement sub-module is configured to perform bass enhancement on the high-frequency signal according to a preset psychoacoustic model, and output an enhanced high-frequency signal as the audio signal.

In some embodiments, the audio signal pre-processing module further comprises an airflow noise-cancelling sub-module, which is configured to eliminate airflow noise in the audio signal through a preset signal processing model and output the audio signal.

In some embodiments, the vibration signal generation module comprises a vibration library sub-module, a signal generation sub-module and an audio conversion sub-module, wherein the vibration library sub-module is configured to generate a vibration material according to a preset vibration scenario and store the vibration material in the preset vibration library; the signal generation sub-module is configured to read the preset vibration library as required, and splice different vibration materials to generate the vibration signal conforming to parameter performance of the two-in-one device; and the audio conversion sub-module is configured to extract the acoustic characteristic of the audio signal, and generate the vibration signal according to the acoustic characteristic.

In some embodiments, the acoustic characteristic is characteristic information of a specific frequency of the audio signal.

In some embodiments, the system further comprises an amplitude-limiting sub-module, which is configured to dynamically limit the audio signal and/or the vibration signal to prevent an amplitude of the audio signal and/or an amplitude of the vibration signal from exceeding a maximum signal amplitude of the two-in-one device.

In some embodiments, after the audio signal and/or the vibration signal are dynamically limited by the amplitude-limiting sub-module, the audio signal has a frequency above 200 Hz, and the vibration signal has a frequency below 200 Hz.

In some embodiments, the signal synthesis module is configured to directly add the audio signal and the vibration signal together based on frequency to obtain the drive signal having frequencies of the audio signal and the vibration signal.

In some embodiments, the amplitude-limiting control module is configured to determine whether the audio signal and the vibration signal exceeds a maximum allowable range of the first component and the second component when the audio signal and the second signal are superposed; wherein when the audio signal and the vibration signal are superposed, the amplitude-limiting control module is configured to predict a superposed frequency within a preset duration after a superposition point, and determine whether the superposed frequency exceeds the maximum allowable range; and if yes, the amplitude-limiting control module is configured to attenuate the audio signal after the superposition point, attenuate the vibration signal after the superposition point, or simultaneously attenuate the vibration signal and the audio signal after the superposition point.

In a second aspect, this application also provides a method for generating a drive signal, wherein the drive signal is configured to drive a two-in-one device integrating a first component capable of generating sound and a second component capable of generating vibration; and the method comprises:

receiving an input signal, and performing low-frequency filtering and acoustic effect processing on the input signal according to a high-pass filtering parameter to obtain an audio signal;

generating a vibration signal based on an acoustic characteristic of the audio signal or a preset vibration library;

superposing the audio signal with the vibration signal to output the drive signal for driving the two-in-one device; and determining whether the audio signal and the vibration signal exceed a maximum allowable range of the first component and the second component when the audio signal and the second signal are superposed, and attenuating the audio signal and/or the vibration signal.

Compared to the prior art, this application has the following beneficial effects.

Regarding the drive signal generation system provided herein, the input signal is received, and subjected to low-frequency filtering and acoustic effect processing according to a high-pass filtering parameter to obtain an audio signal; a vibration signal is generated based on an acoustic characteristic of the audio signal or a preset vibration library; the audio signal is superposed with the vibration signal to output the drive signal for driving the two-in-one device; and whether an amplitude of the audio signal exceeds a maximum allowable range of the first component and an amplitude of the vibration signal exceeds a maximum allowable range of the second component when the audio signal and the second signal are superposed is determined, and the audio signal and/or the vibration signal are/is attenuated. By means of the signal generation method designed herein, the audio signal and the vibration signal can be superposed while retaining their respective own drive functions, so as to obtain a single drive signal, reducing the connection requirements of the drive circuit. Moreover, this application enables the simultaneous or separate use of the two components, and can reduce the manufacture cost of the terminal equipment and improve the space utilization within the terminal equipment.

BRIEF DESCRIPTION OF THE DRAWINGS

In order to illustrate the technical solutions in the embodiments of the present application more clearly, the drawings needed in the description of the embodiments of the present application will be briefly described below. Obviously, presented in the drawings are merely some embodiments of this application, which are not intended to limit this application. For those skilled in the art, other drawings can be obtained based on the drawings provided herein without making creative effort.

DETAILED DESCRIPTION OF THE EMBODIMENTS

The technical solutions of the present application will be described clearly and completely below with reference to the accompanying drawings and embodiments. Obviously, described below are merely some embodiments of the present application, which are not intended to limit the present application. It should be understood that other embodiments obtained by those skilled in the art based on the content disclosed herein without making creative effort should fall within the scope of the present application.

Figure 1:
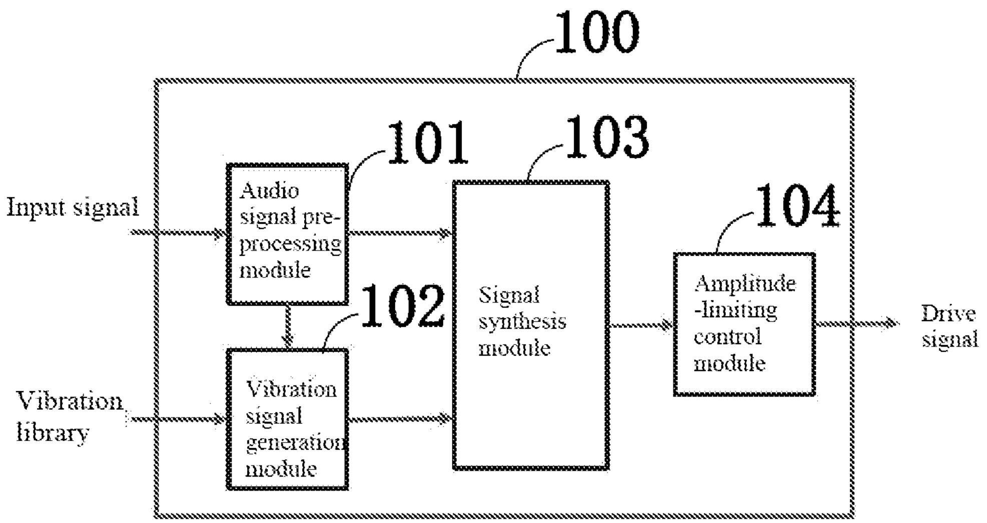
FIG. 1 structurally illustrates a drive signal generation system according to an embodiment of the present application.

An embodiment of this application provides a system for generating a drive signal, which is structurally shown in FIG. 1. The drive signal is configured to drive a two-in-one device integrating a first component capable of generating sound and a second component capable of generating vibration. The system 100 includes:

an audio signal pre-processing module 101;

a vibration signal generation module 102;

a signal synthesis module 103; and an amplitude-limiting control module 104;

where the audio signal pre-processing module 101 is configured to receive an input signal, and perform low-frequency filtering and acoustic effect processing on the input signal according to a high-pass filtering parameter to obtain an audio signal;

the vibration signal generation module 102 is configured to generate a vibration signal based on an acoustic characteristic of the audio signal or a preset vibration library;

the signal synthesis module 103 is configured to superpose the audio signal with the vibration signal to output the drive signal for driving the two-in-one device; and the amplitude-limiting control module 104 is configured to determine whether the audio signal and the vibration signal exceed a maximum allowable range of the first component and the second component when the audio signal and the second signal are superposed, and attenuate the audio signal and/or the vibration signal.

Specifically, the drive signal generation system 100 provided herein is used in conjunction with and connected to a power amplifier, a front-end circuit and a two-in-one device, where a single power amplifier is arranged for general digital signal enhancement processing; the front-end circuit is used for connection with the two-in-one device; and the drive signal in an embodiment of the present application is loaded to the two-in-one device through the front-end circuit. In a practical structure, the first component in the two-in-one device has a first loading end, and the second component in the two-in-one device has a second loading end; and the front-end circuit is configured to process the drive signal to load the audio signal to the first loading end and the vibration signal to the second loading end to enable the driving of the two-in-one device.

Figure 2:
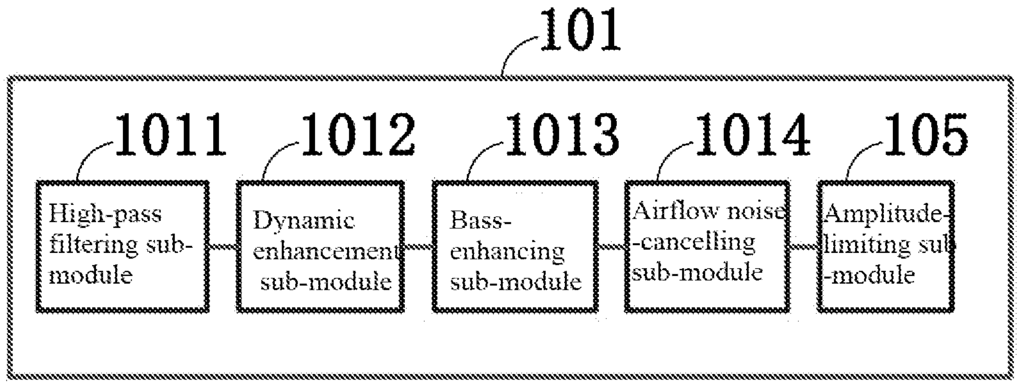
FIG. 2 structurally shows an audio signal pre-processing module according to an embodiment of this application.

Referring to an embodiment shown in FIG. 2, the audio signal pre-processing module 101 includes:

a high-pass filtering sub-module 1011;

a dynamic enhancement sub-module 1012; and a bass enhancement sub-module 1013;

where the high-pass filtering sub-module 1011 is configured to perform low-frequency filtering on the input signal according to the high-pass filtering parameter to obtain a high-frequency signal;

the dynamic enhancement sub-module 1012 is configured to dynamically adjust the high-frequency signal to improve audio loudness; and the bass enhancement sub-module 1013 is configured to perform bass enhancement on the high-frequency signal according to a preset psychoacoustic model, and output an enhanced high-frequency signal as the audio signal.

The high-pass filtering parameter is predetermined according to the two-in-one device and the drive circuit, and is used as a reference to filter out the low-frequency part in the input signal, thereby preventing the low-frequency part from being read by the second component (for vibration) and reducing the interference from vibration.

In an embodiment, the audio signal pre-processing module 101 further includes an airflow noise-cancelling sub-module 1014, which is configured to eliminate airflow noise in the audio signal through a preset signal processing model and output the audio signal. The airflow noise refers to the noise data in the input signal, and the preset signal processing model can be implemented based on the central processing unit (CPU) or digital signal processor (DSP) in the drive circuit, or peripheral Codec, DSP on the amplifier chip or other hardware devices that can run algorithms.

Figure 3:
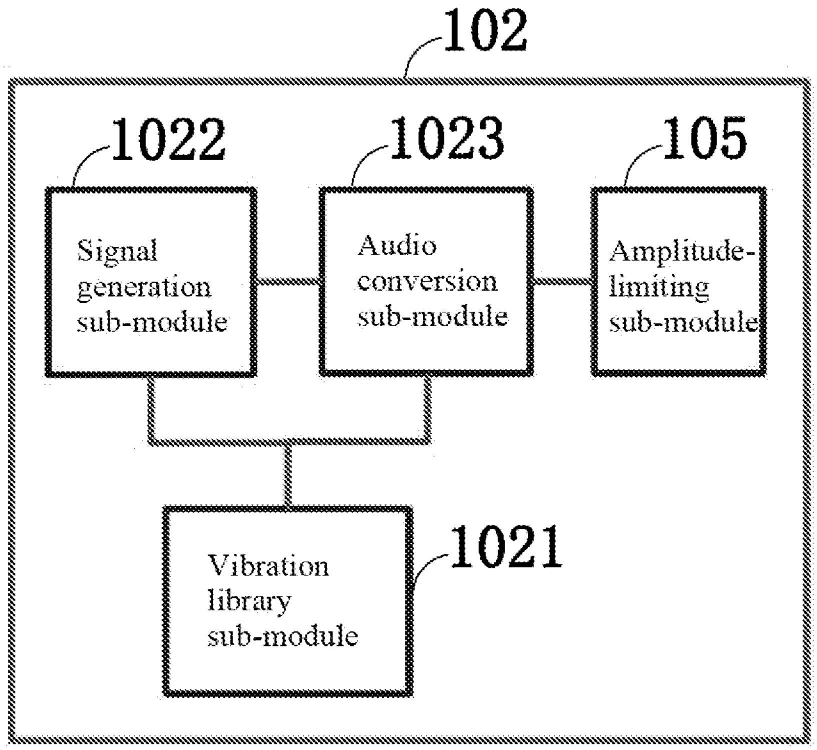
FIG. 3 structurally shows a vibration signal generation module according to an embodiment of this application.

Referring to an embodiment shown in FIG. 3, the vibration signal generation module 102 includes:

a vibration library sub-module 1021;

a signal generation sub-module 1022; and an audio conversion sub-module 1023;

where the vibration library sub-module 1021 is configured to generate a vibration material according to a preset vibration scenario and store the vibration material in the preset vibration library; the signal generation sub-module 1022 is configured to read the preset vibration library as required, and splice different vibration materials to generate the vibration signal conforming to parameter performance of the two-in-one device; and the audio conversion sub-module 1023 is configured to extract the acoustic characteristic of the audio signal, and generate the vibration signal according to the acoustic characteristic.

The preset vibration scenario includes click, delete, engine, etc. The vibration library sub-module 1021 is configured to extract key features of motor vibration in the scenario to generate the vibration material. In some implementations, the vibration material may also be manually generated; correspondingly, the signal generation sub-module 1022 splices the vibration materials according to a desired scenario to obtain the vibration signal, and in this case, the vibration signal is determined by the use scenario of the two-in-one device.

In some embodiments, the acoustic characteristic is characteristic information of a specific frequency of the audio signal. When the audio conversion sub-module 1023 generates the vibration signal based on the extracted acoustic feature, the vibration signal can be more correlated with the audio content played by the two-in-one device, so as to arrived at a better acoustic effect. That is, the signal generation sub-module 1022 and the audio conversion sub-module 1023 are selected for use according to the needs of different scenarios. In some implementations, after the vibration signal is generated in the audio conversion sub-module 1023 based on the acoustic characteristic, the signal generation sub-module 1022 further optimizes the vibration signal based on data from the library, thereby improving the acoustic effect.

In some embodiments, the drive signal generation system 100 further includes an amplitude-limiting sub-module 105, which is configured to dynamically limit the audio signal and/or the vibration signal to prevent the amplitude of the audio signal and/or the amplitude of the vibration signal from exceeding a maximum signal amplitude of the two-in-one device. As shown in FIGS. 2 and 3, the amplitude-limiting sub-module 105 can be arranged at an output end of the audio signal pre-processing module 101 or an output end of the vibration signal generation module 102.

In an embodiment, after dynamically limited by the amplitude-limiting sub-module, the audio signal has a frequency above 200 Hz, and the vibration signal has a frequency below 200 Hz.

Since the vibration signal is mainly at low frequencies below 200 Hz and the audio signal is at high frequencies above 200 Hz, and these two signals have been processed, there will not be overlapped frequency part therebetween. Preferably, the signal synthesis module 103 directly adds the audio signal and the vibration signal together based on frequency to obtain the drive signal having frequencies of the audio signal and the vibration signal.

In an embodiment, the amplitude-limiting control module is configured to determine whether the audio signal and the vibration signal exceed the maximum allowable range of the first component and the second component when the audio signal and the second signal are superposed, where when the audio signal and the vibration signal are superposed, the amplitude-limiting control module 104 is configured to predict a superposed frequency within a preset duration after a superposition point, and determine whether the superposed frequency exceeds the maximum allowable range of the first component and of the second component; and if yes, the amplitude-limiting control module 104 is configured to attenuate the audio signal after the superposition point, attenuate the vibration signal after the superposition point, or simultaneously attenuate the vibration signal and the audio signal after the superposition point.

Regarding the drive signal generation system provided herein, the input signal is received, and subjected to low-frequency filtering and acoustic effect processing according to a high-pass filtering parameter to obtain an audio signal; a vibration signal is generated based on an acoustic characteristic of the audio signal or a preset vibration library; the audio signal is superposed with the vibration signal to output the drive signal for driving the two-in-one device; and whether the audio signal and the vibration signal exceed a maximum allowable range of the first component and the second component when the audio signal and the second signal are superposed is determined, and the audio signal and/or the vibration signal are/is attenuated. By means of the signal generation method designed herein, the audio signal and the vibration signal can be superposed while retaining their respective own drive functions, so as to obtain a single drive signal, reducing the connection requirements of the drive circuit. Moreover, this application enables the simultaneous or separate use of the two components, and can reduce the manufacture cost of the terminal equipment and improve the space utilization within the terminal equipment.

Figure 4:
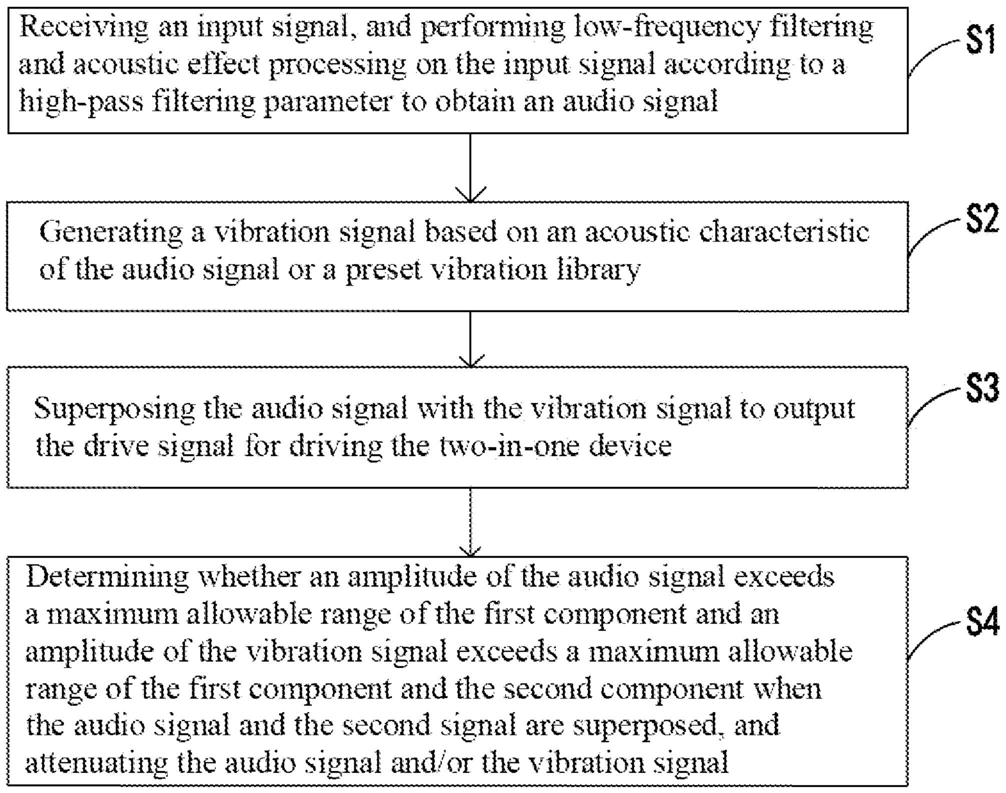
FIG. 4 is a flow chart of a drive signal generation method according to an embodiment of this application.

An embodiment of the present application also provides a method for generating a drive signal, which is displayed in FIG. 4. The drive signal is configured to drive a two-in-one device integrating a first component capable of generating sound and a second component capable of generating vibration. The method is performed through the following steps.

(S1) An input signal is received, and low-frequency filtering and acoustic effect processing are performed on the input signal according to a high-pass filtering parameter to obtain an audio signal.

(S2) A vibration signal is generated based on an acoustic characteristic of the audio signal or a preset vibration library.

(S3) The audio signal is superposed with the vibration signal to output the drive signal for driving the two-in-one device.

(S4) Whether the audio signal and the vibration signal exceed a maximum allowable range of the first component and the second component when the audio signal and the second signal are superposed is determined, and the audio signal and/or the vibration signal are/is attenuated.

The described drive signal generation method, when implemented, can arrive at the same technical effect as the drive signal generation system described above, and thus the technical effect of the drive signal generation method will not be described herein.

Described above are merely preferred embodiments of the present application, which are not intended to limit the present application. It should be understood that any variations, replacements and modifications made by those of ordinary skill in the art without departing from the spirit and scope of the present application shall fall within the scope of the present application defined by the appended claims.

What is claimed is:

1. A system for generating a drive signal, the drive signal being configured to drive a two-in-one device integrating a first component capable of generating sound and a second component capable of generating vibration; and the system comprising:
- an audio signal pre-processing module;
- a vibration signal generation module;
- a signal synthesis module; and
- an amplitude-limiting control module;
- wherein the audio signal pre-processing module is configured to receive an input signal, and perform low-frequency filtering and acoustic effect processing on the input signal according to a high-pass filtering parameter to obtain an audio signal;
- the vibration signal generation module is configured to generate a vibration signal based on an acoustic characteristic of the audio signal or a preset vibration library;
- the signal synthesis module is configured to superpose the audio signal with the vibration signal to output the drive signal for driving the two-in-one device; and
- the amplitude-limiting control module is configured to determine whether the audio signal and the vibration signal exceed a maximum allowable range of the first component and the second component when the audio signal and the vibration signal are superposed, and attenuate the audio signal and/or the vibration signal.

2. The system for generating a drive signal of claim 1, wherein the audio signal pre-processing module comprises:
- a high-pass filtering sub-module;
- a dynamic enhancement sub-module; and
- a bass enhancement sub-module;
- wherein the high-pass filtering sub-module is configured to perform low-frequency filtering on the input signal according to the high-pass filtering parameter to obtain a high-frequency signal;
- the dynamic enhancement sub-module is configured to dynamically adjust the high-frequency signal to improve audio loudness; and
- the bass enhancement sub-module is configured to perform bass enhancement on the high-frequency signal according to a preset psychoacoustic model, and output an enhanced high-frequency signal as the audio signal.

3. The system for generating a drive signal of claim 2, wherein the audio signal pre-processing module further comprises an airflow noise-cancelling sub-module, and the airflow noise-cancelling sub-module is configured to eliminate airflow noise in the audio signal through a preset signal processing model and output the audio signal.

4. The system for generating a drive signal of claim 1, wherein the vibration signal generation module comprises:
- a vibration library sub-module;
- a signal generation sub-module; and
- an audio conversion sub-module;
- wherein the vibration library sub-module is configured to generate a vibration material according to a preset vibration scenario and store the vibration material in the preset vibration library;
- the signal generation sub-module is configured to read the preset vibration library as required, and splice different vibration materials to generate the vibration signal conforming to parameter performance of the two-in-one device; and
- the audio conversion sub-module is configured to extract the acoustic characteristic of the audio signal, and generate the vibration signal according to the acoustic characteristic.

5. The system for generating a drive signal of claim 4, wherein the acoustic characteristic is characteristic information of a specific frequency of the audio signal.

6. The system for generating a drive signal of claim 1, further comprising:
- an amplitude-limiting sub-module;
- wherein the amplitude-limiting sub-module is configured to dynamically limit the audio signal and/or the vibration signal to prevent an amplitude of the audio signal and/or an amplitude of the vibration signal from exceeding a maximum signal amplitude of the two-in-one device.

7. The system for generating a drive signal of claim 6, wherein after the audio signal and/or the vibration signal are/is dynamically limited by the amplitude-limiting sub-module, the audio signal has a frequency above 200 Hz, and the vibration signal has a frequency below 200 Hz.

8. The system for generating a drive signal of claim 7, wherein the signal synthesis module is configured to directly add the audio signal and the vibration signal together based on frequency to obtain the drive signal having frequencies of the audio signal and the vibration signal.

9. The system for generating a drive signal of claim 8, wherein the amplitude-limiting control module is configured to determine whether the audio signal and the vibration signal exceed the maximum allowable range of the first component and the second component when the audio signal and the vibration signal are superposed; wherein when the audio signal and the vibration signal are superposed, the amplitude-limiting control module is configured to predict a superposed frequency within a preset duration after a superposition point, and determine whether the superposed frequency exceeds the maximum allowable range; if yes, the amplitude-limiting control module is configured to attenuate the audio signal after the superposition point, attenuate the vibration signal after the superposition point, or simultaneously attenuate the vibration signal and the audio signal after the superposition point.

10. A method for generating a drive signal, the drive signal being configured to drive a two-in-one device integrating a first component capable of generating sound and a second component capable of generating vibration; and the method comprising:

receiving an input signal, and performing low-frequency filtering and acoustic effect processing on the input signal according to a high-pass filtering parameter to obtain an audio signal;

generating a vibration signal based on an acoustic characteristic of the audio signal or a preset vibration library;

superposing the audio signal with the vibration signal to output the drive signal for driving the two-in-one device; and determining whether the audio signal and the vibration signal exceed a maximum allowable range of the first component and the second component when the audio signal and the vibration signal are superposed, and attenuating the audio signal and/or the vibration signal.

* * * * *